(12) United States Patent
Xu

(10) Patent No.: US 9,967,190 B2
(45) Date of Patent: May 8, 2018

(54) SESSION LINK CONTROL METHOD AND APPARATUS, AND COMPUTER STORAGE MEDIUM

(71) Applicant: ZTE Corporation, Shenzhen (CN)

(72) Inventor: Lin Xu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 107 days.

(21) Appl. No.: 15/021,768

(22) PCT Filed: Apr. 14, 2014

(86) PCT No.: PCT/CN2014/075244
§ 371 (c)(1),
(2) Date: Mar. 14, 2016

(87) PCT Pub. No.: WO2015/035770
PCT Pub. Date: Mar. 19, 2015

(65) Prior Publication Data
US 2016/0226770 A1 Aug. 4, 2016

(30) Foreign Application Priority Data
Sep. 16, 2013 (CN) .......................... 2013 1 0423269

(51) Int. Cl.
*H04L 12/803* (2013.01)
*H04W 36/26* (2009.01)
(Continued)

(52) U.S. Cl.
CPC ........... *H04L 47/122* (2013.01); *H04W 36/26* (2013.01); *H04L 45/22* (2013.01); *H04W 40/12* (2013.01);
(Continued)

(58) Field of Classification Search
CPC ... H04W 40/24; H04W 40/12; H04W 40/248; H04W 28/00; H04W 72/00; H04W 72/04;
(Continued)

(56) References Cited

U.S. PATENT DOCUMENTS 7,791,637 B2    9/2010 Nanba
8,554,242 B1 * 10/2013 Gunasekara .......... H04W 28/20
                                                          370/208
(Continued)

FOREIGN PATENT DOCUMENTS

CN              1964355 A    5/2007
CN            101345981 A    1/2009
(Continued)

OTHER PUBLICATIONS

International Search Report in international application No. PCT/CN2014/075244, dated Jul. 3, 2014.
(Continued)

*Primary Examiner* — Warner Wong
(74) *Attorney, Agent, or Firm* — Oppedahl Patent Law Firm LLC

(57) ABSTRACT

Disclosed is a session link control method. The method comprises: monitoring a data transmission rate of a transmission link used currently by a mobile terminal; and when it is monitored that the data transmission rate of the transmission link where the mobile terminal is located is lower than a preset rate threshold, creating a new transmission link for the mobile terminal, and controlling the mobile terminal to be switched from the current transmission link to the new transmission link. In addition, also disclosed are a session link control apparatus and a computer storage medium.

12 Claims, 1 Drawing Sheet

---

A data transmission rate over a current transmission link used by a mobile terminal is monitored — 11

In the case that it is monitored that the data transmission rate over the current transmission link used by the mobile terminal is lower than a pre-set rate threshold, a new transmission link is created for the mobile terminal, and the mobile terminal is controlled to switch from the current transmission link to the new transmission link — 12

(51) Int. Cl.
  *H04W 72/12* (2009.01)
  *H04W 72/04* (2009.01)
  *H04W 76/06* (2009.01)
  *H04W 40/12* (2009.01)
  *H04W 40/34* (2009.01)
  *H04W 40/24* (2009.01)
  *H04L 12/707* (2013.01)

(52) U.S. Cl.
  CPC .......... *H04W 40/248* (2013.01); *H04W 40/34* (2013.01); *H04W 72/0493* (2013.01); *H04W 72/1257* (2013.01); *H04W 76/066* (2013.01)

(58) Field of Classification Search
  CPC ......... H04W 72/0486; H04W 72/0493; H04W 72/12; H04W 72/1252; H04W 72/1257; H04L 47/122; H04L 2012/5631; H04L 2012/5692; H04L 47/76; H04L 47/78
  See application file for complete search history.

(56) References Cited

U.S. PATENT DOCUMENTS

| | | | | |
|---|---|---|---|---|
| 8,693,499 | B2* | 4/2014 | Chandrasekaran | H04L 41/0896 370/230 |
| 2002/0141353 | A1* | 10/2002 | Ludwig | H04L 47/10 370/254 |
| 2003/0185154 | A1* | 10/2003 | Mullendore | H04L 47/10 370/230 |
| 2004/0017795 | A1* | 1/2004 | Abraham | H04W 36/26 370/348 |
| 2004/0203820 | A1* | 10/2004 | Billhartz | H04L 45/26 455/452.1 |
| 2006/0059265 | A1 | 3/2006 | Keronen | |
| 2007/0037572 | A1 | 2/2007 | Nanba | |
| 2008/0019289 | A1 | 1/2008 | Monden | |
| 2010/0227565 | A1* | 9/2010 | Sun | H04W 68/08 455/67.11 |
| 2011/0034196 | A1* | 2/2011 | Jonishi | H04W 24/02 455/509 |
| 2012/0269088 | A1 | 10/2012 | Monden | |
| 2013/0091281 | A1 | 4/2013 | Chai et al. | |
| 2013/0102313 | A1 | 4/2013 | Tinnakornsrisuphap | |
| 2014/0029434 | A1 | 1/2014 | Wang | |
| 2014/0334306 | A1 | 11/2014 | Yang et al. | |
| 2016/0057293 | A1 | 2/2016 | Chai et al. | |

FOREIGN PATENT DOCUMENTS

| | | |
|---|---|---|
| CN | 102055676 A | 5/2011 |
| CN | 102215523 A | 10/2011 |
| CN | 102264063 A | 11/2011 |
| CN | 102469082 A | 5/2012 |
| CN | 102572946 A | 7/2012 |
| EP | 2579506 A1 | 4/2013 |
| EP | 2790434 A1 | 10/2014 |
| RU | 2446636 C2 | 3/2012 |
| WO | 2004021646 A1 | 3/2004 |
| WO | 2012109478 A1 | 8/2012 |
| WO | 2013097757 A1 | 7/2013 |

OTHER PUBLICATIONS

English Translation of the Written Opinion of the International Search Authority in international application No. PCT/CN2014/075244, dated Jul. 3, 2014.
Supplementary European Search Report in European application No. 14844727.9, dated Aug. 12, 2016.

* cited by examiner

SESSION LINK CONTROL METHOD AND APPARATUS, AND COMPUTER STORAGE MEDIUM

TECHNICAL FIELD

The disclosure relates to communication link control technique, and in particular to a session link control method and apparatus, and a computer storage medium.

BACKGROUND

With the development of communication technology, functions supported by mobile terminals bring great convenience to the lives of users. For example, a user can not only communicate with other users by using a calling function and a short messaging function of a mobile terminal, but also have a session with other users by using applications installed on the mobile terminal such as QQ and WeChat.

Currently, public places such as some restaurants and buses provide Wireless Fidelity (WiFi) access, and users can surf the internet by using the mobile terminals when having a dinner or taking a bus so as to browse their favourite contents. However, in view of that most of the public places are user dense regions, when most of the users taking a same bus surf the internet by using WiFi, they may use a same frequency resource, so that it is easy to cause congestion of a communication link allocated for the frequency resource, and thus some users cannot enjoy high-speed network resources.

SUMMARY

In view of the above, the embodiments of the disclosure provide a session link control method and apparatus, and a computer storage medium, which can improve the reliability of a transmission link, reduce a communication dropping rate and thus ensure the transmission smoothness.

The technical solutions of the embodiments of the disclosure are implemented as follows.

An embodiment of the disclosure provides a session link control method, including:

a data transmission rate over a current transmission link used by a mobile terminal is monitored; and in the case that it is monitored that the data transmission rate over the current transmission link used by the mobile terminal is lower than a pre-set rate threshold, a new transmission link is created for the mobile terminal, and the mobile terminal is controlled to switch from the current transmission link to the new transmission link.

In an embodiment, the step that the data transmission rate over the current transmission link used by the mobile terminal is monitored may include that:

it is monitored whether data transmission currently exists on the mobile terminal, and if it is monitored that data transmission currently exists on the mobile terminal, a session request message is sent to the mobile terminal; and when a session response message sent by the mobile terminal is received, a transmission rate carried in the session response message is taken as a monitored current transmission rate of the mobile terminal.

In an embodiment, the method may further include: after the transmission rate carried in the session response message is taken as the monitored current transmission rate of the mobile terminal, the monitored current transmission rate of the mobile terminal is compared with the pre-set rate threshold.

In an embodiment, the step that the mobile terminal is controlled to switch from the current transmission link to the new transmission link may include that:

when it is determined that the monitored current transmission rate of the mobile terminal is lower than the pre-set rate threshold, the new transmission link is created for the mobile terminal, the new transmission link is added to a routing table for the mobile terminal, and the routing table is sent to the mobile terminal, so that the mobile terminal performs data transmission according to the routing table.

In an embodiment, the method may further include that:

a sending mode of the session response message of the mobile terminal is configured, so that the mobile terminal sends the session response message according to the sending mode.

An embodiment of the disclosure also provides a session link control apparatus including a monitoring unit, a creating unit and a control unit, in which:

the monitoring unit is configured to monitor a data transmission rate over a current transmission link used by a mobile terminal, and trigger the creating unit in the case that it is monitored that the data transmission rate over the current transmission link used by the mobile terminal is lower than a pre-set rate threshold;

the creating unit is configured to create a new transmission link for the mobile terminal; and the control unit is configured to control the mobile terminal to switch from the current transmission link to the new transmission link.

In an embodiment, the apparatus may further include a first transmission unit, in which:

the monitoring unit is configured to trigger the first transmission unit in the case that it is monitored that data transmission currently exists on the mobile terminal;

the first transmission unit is configured to send a session request message and receive a session response message corresponding to the session request message; and the monitoring unit is configured to take a transmission rate carried in the session response message as a monitored current transmission rate of the mobile terminal.

In an embodiment, the monitoring unit may be further configured to compare the monitored current transmission rate of the mobile terminal with the pre-set rate threshold.

In an embodiment, the monitoring unit may be configured to trigger the creating unit when it is determined that the monitored current transmission rate of the mobile terminal is lower than the pre-set rate threshold;

the creating unit may be configured to create the new transmission link for the mobile terminal, add the new transmission link to a routing table for the mobile terminal, and transmit the routing table to the first transmission unit;

the first transmission unit may be configured to send the routing table to the mobile terminal; and the control unit may be configured to control the mobile terminal to switch from the current transmission link to the new transmission link in the routing table, so that the mobile terminal performs data transmission using the new transmission link.

In an embodiment, the apparatus may further include: a configuration unit, configured to configure a sending mode of the session response message of the mobile terminal, so that the mobile terminal sends the session response message according to the sending mode.

An embodiment of the disclosure also provides a computer storage medium having stored therein computer executable instructions for performing the session link control method described above.

The embodiments of the disclosure provide the session link control method and apparatus, and the computer storage medium. The method includes: the data transmission rate over the current transmission link used by the mobile terminal is monitored; and in the case that it is monitored that the data transmission rate over the current transmission link used by the mobile terminal is lower than the pre-set rate threshold, the new transmission link is created for the mobile terminal, and the mobile terminal is controlled to switch from the current transmission link to the new transmission link. By means of the technical solutions in the embodiments of the disclosure, a congested transmission link can be prevented from being used for a session service of the mobile terminal, and the transmission reliability and smoothness of the session service are ensured.

DETAILED DESCRIPTION

Figure 1:
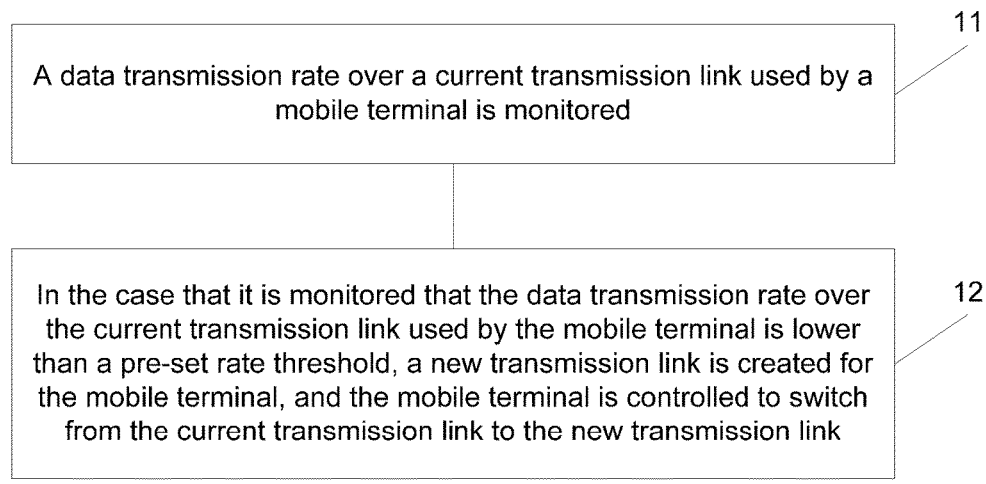
FIG. 1 is a flowchart of a session link control method according to an embodiment of the disclosure.

As shown in FIG. 1, an embodiment of the disclosure provides a session link control method, which includes the steps as follows.

Step 11, a data transmission rate over a transmission link used currently by a mobile terminal is monitored.

In the embodiment of the disclosure, an involved communication entity also includes a server in addition to the mobile terminal.

The server monitors a communication service such as calling and short messaging between the mobile terminal and other mobile terminals in real time, or monitors an internet-surfing service of the mobile terminal; in the embodiment of the disclosure, the communication service and the internet-surfing service are collectively known as a session service, data transmitted by the communication service and the internet-surfing service are counted as session service data, and involved data in the subsequent technical solutions of the embodiments of the disclosure refer to the session service data.

In the case that it is monitored that the session service data exists on the mobile terminal, the server sends a session request message to the mobile terminal, and after receiving the session request message, the mobile terminal sends a session response message for the session service data to the server.

The session response message includes: a session service number, the type of a protocol used by the session service, an Internal Mobile Subscriber Identification Number (IMSI) of the mobile terminal, a communication number of the mobile terminal, an Internet Protocol (IP) address of the mobile terminal, an uplink transmission rate and a downlink transmission rate of the session service, IP addresses of other mobile terminals having a session service with the mobile terminal or an IP address of a network side device such as a session server having a session service with the mobile terminal, communication numbers of the other mobile terminals or a port number of the session server, session starting time, session ending time and other parameters.

Specifically, due to the fact that the session service carried out by the mobile terminal may be the communication service such as calling and short messaging between the mobile terminal and the other mobile terminals or the mobile terminal may access to a network side by using the session server which provides network resources for the mobile terminal, in the case that it is monitored that the mobile terminal has a session service with the other mobile terminals, the session response message includes: the session service number, the type of the protocol used by the session service, the IMSI of the mobile terminal, the communication number of the mobile terminal, the IP address of the mobile terminal, the uplink transmission rate and the downlink transmission rate of the session service, the IP addresses of the other mobile terminals, the communication numbers of the other mobile terminals, the session starting time, the session ending time and other parameters; and in the case that it is monitored that the mobile terminal performs an internet-surfing service, the session response message includes: the session service number, the type of the protocol used by the session service, the IMSI of the mobile terminal, the communication number of the mobile terminal, the IP address of the mobile terminal, the uplink transmission rate and the downlink transmission rate of the session service, the IP address of the network side device such as the session server, the port number of the session server, the session starting time, the session ending time and other parameters.

In descriptions of the technical solution, the type of the protocol used by the session service includes: a User Datagram Protocol (UDP) and a Transmission Control Protocol (TCP).

In the embodiment of the disclosure, a server side is configured with modes through which the mobile terminal is required to send the session response message, including a mode 1 and a mode 2, wherein in the mode 1, the mobile terminal is required to send a session response message including all the parameters described above; and in the mode 2, the mobile terminal is required to send a session response message including all parameters except the session starting time and the session ending time. A sending mode of the session response message is carried in a session request message sent to the mobile terminal by the server, and after receiving the session request message, the mobile terminal sends the session response message according to the sending mode of the session response message carried in the session request message.

Step 12, in the case that it is monitored that the data transmission rate over the transmission link used by the mobile terminal is lower than a pre-set rate threshold, a new transmission link is created for the mobile terminal, and the mobile terminal is controlled to switch from the current transmission link to the new transmission link.

In this step, the server counts the data transmission rate over the currently used transmission link occupied by the mobile terminal via the uplink transmission rate and the downlink transmission rate in the session response message sent by the mobile terminal, and takes the counted transmission rate as the current transmission rate for the mobile terminal. The counted data transmission rate over the transmission link occupied by the mobile terminal is compared with the pre-set rate threshold, and when it is determined that the counted data transmission rate over the transmission link occupied by the mobile terminal is lower than the pre-set rate threshold, the server creates a new transmission link according to a radio bearer protocol standard, adds the new transmission link to a routing table set for the mobile terminal, assigns the new transmission link to the mobile terminal, and then sends the routing table to the mobile terminal, so that the mobile terminal transmits the session service data using the new transmission link according to records of the routing table.

Here, when transmitting the session service data using the new transmission link according to the routing table, the mobile terminal may send a switching completion message to the server; and upon reception of the switching completion message sent by the mobile terminal, the server determines that the terminal successfully switches to the new transmission link.

An embodiment of the disclosure also provides a computer storage medium having stored therein computer executable instructions for performing the session link control method described above.

In the solution, when the transmission rate over the original data transmission link of the mobile terminal is lower than the pre-set rate threshold, the terminal can switch to the new transmission link for data transmission. Thus, a congested transmission link can be avoided for the mobile terminal, the data transmission smoothness of the mobile terminal is ensured, and in addition, a communication dropping rate of the session service is also reduced.

On the basis of the session link control method described above, as shown in FIG. 2, an embodiment of the disclosure also provides a session link control apparatus including a monitoring unit 21, a creating unit 22 and a control unit 23, in which:

the monitoring unit 21 is configured to monitor a data transmission rate over a current transmission link used by a mobile terminal, and trigger the creating unit 22 in the case that it is monitored that the data transmission rate over the current transmission link used by the mobile terminal is lower than a pre-set rate threshold;

the creating unit 22 is configured to create a new transmission link for the mobile terminal; and the control unit 23 is configured to control the mobile terminal to switch from the current transmission link to the new transmission link.

Figure 2:
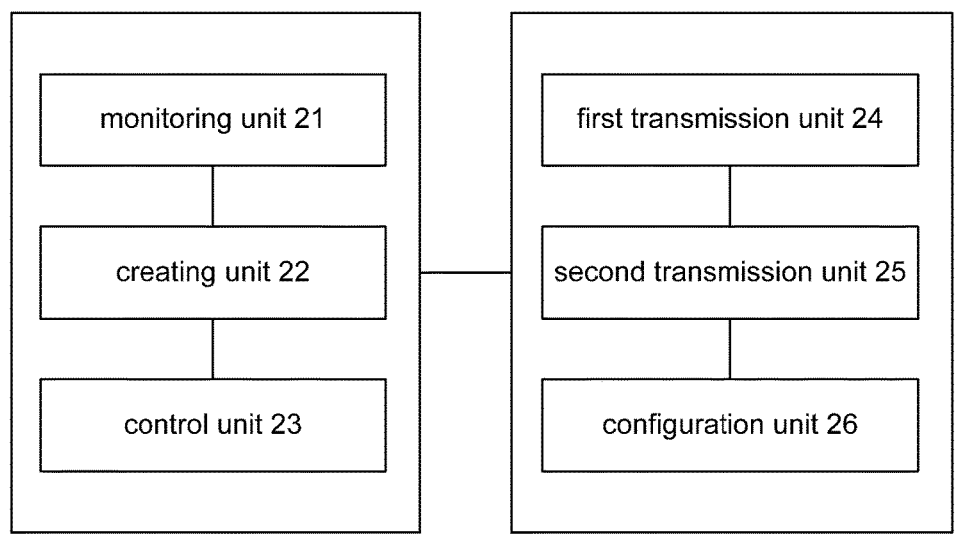
FIG. 2 is a schematic structural diagram of a session link control apparatus according to an embodiment of the disclosure.

As shown in FIG. 2, the apparatus further includes a first transmission unit 24, a second transmission unit 25 and a configuration unit 26.

The monitoring unit 21, the creating unit 22, the control unit 23, the first transmission unit 24 and the configuration unit 26 can each be implemented by a Central Processing Unit (CPU), or a Digital Signal Processor (DSP), or a Field Programmable Gate Array (FPGA) and the like; the CPU, the DSP and the FPGA can each be built in a server in a network; and the second transmission unit 25 can be implemented by a CPU, a DSP and an FPGA built in the mobile terminal.

The server, specifically the monitoring unit 21, monitors a communication service such as calling and short messaging between the mobile terminal and other mobile terminals in real time, or monitors an internet-surfing service of the mobile terminal; in the case that it is monitored that session service data exist on the mobile terminal, the first transmission unit 24 is triggered; the first transmission unit 24 sends a session request message to the mobile terminal, specifically, the second transmission unit 25; and the second transmission unit 25 receives the session request message, and sends, according to a sending mode of the session response message carried in the session request message, a session response message of the current session service data of the mobile terminal to the server, specifically, the monitoring unit 21.

For the content included in the session response message, please refer to the descriptions in the abovementioned method, which will not be described herein in detail.

The server, specifically, the configuration unit 26 is configured with modes through which the mobile terminal is required to send the session response message, including a mode 1 and a mode 2, wherein in the mode 1, the mobile terminal is required to send a session response message including all the parameters described above; and in the mode 2, the mobile terminal is required to send a session response message including all parameters except the session starting time and the session ending time.

The server, specifically, the monitoring unit 21 counts a received uplink transmission rate and a received downlink transmission rate in the session response message sent by the mobile terminal, specifically, the second transmission unit 25, and takes the counted transmission rate over the transmission link occupied by the mobile terminal as the monitored current transmission rate of the mobile terminal; it is compared whether the data transmission rate over the currently used transmission link occupied by the mobile terminal is lower than a pre-set rate threshold; when the monitoring unit 21 determines that the data transmission rate over the currently used transmission link occupied by the mobile terminal is lower than the pre-set rate threshold, the creating unit 22 is triggered; the creating unit 22 creates a new transmission link according to a radio bearer protocol standard, adds the new transmission link to a routing table set for the mobile terminal, and transmits the routing table to the first transmission unit 24; the control unit 23 assigns the new transmission link to the mobile terminal; the first transmission unit 24 sends the routing table to the mobile terminal, specifically, the second transmission unit 25; and the second transmission unit 25 receives the routing table, so that the mobile terminal transmits a session service using the new transmission link.

Or, the mobile terminal, specifically, the second transmission unit 25 receives the routing table, when the mobile terminal transmits session service data using the new transmission link in the routing table, the second transmission unit 25 sends a switching completion message to the server, specifically, the control unit 23; and the control unit 23 determines that the transmission link of the mobile terminal is switched successfully.

The embodiments of the disclosure provide the session link control method and apparatus, and the computer storage medium. The method includes: the data transmission rate over the current transmission link used by the mobile terminal is monitored; and in the case that it is monitored that the data transmission rate over the current transmission link used by the mobile terminal is lower than the pre-set rate threshold, the new transmission link is created for the mobile terminal, and the mobile terminal is controlled to switch from the current transmission link to the new transmission link. By means of the technical solutions in the embodiments of the disclosure, the congested transmission link can be prevented from being used for the session service of the mobile terminal, and the transmission reliability and smoothness of the session service are ensured.

What described are merely preferable embodiments of the disclosure, and is not intended to limit the protection scope of the disclosure.

What is claimed is:
1. A session link control method, comprising:
monitoring a data transmission rate over a current transmission link used by a mobile terminal; and in the case that it is monitored that the data transmission rate over the current transmission link used by the mobile terminal is lower than a pre-set rate threshold, creating a new transmission link for the mobile terminal, and controlling the mobile terminal to switch from the current transmission link to the new transmission link, wherein monitoring the data transmission rate over the current transmission link used by the mobile terminal comprises:

monitoring whether data transmission currently exists on the mobile terminal, and if it is monitored that data transmission currently exists on the mobile terminal, sending a session request message to the mobile terminal; and when a session response message sent by the mobile terminal is received, taking a transmission rate carried in the session response message as a monitored current transmission rate of the mobile terminal.

2. The session link control method according to claim 1, further comprising: after taking the transmission rate carried in the session response message as the monitored current transmission rate of the mobile terminal, comparing the monitored current transmission rate of the mobile terminal with the pre-set rate threshold.

3. The session link control method according to claim 1, wherein controlling the mobile terminal to switch from the current transmission link to the new transmission link comprises:

when it is determined that the monitored current transmission rate of the mobile terminal is lower than the pre-set rate threshold, creating the new transmission link for the mobile terminal, adding the new transmission link to a routing table for the mobile terminal, and sending the routing table to the mobile terminal, so that the mobile terminal performs data transmission according to the routing table.

4. The session link control method according to claim 1, further comprising:

configuring a sending mode of the session response message of the mobile terminal, so that the mobile terminal sends the session response message according to the sending mode.

5. A session link control apparatus, comprising: a monitoring unit, a creating unit and a control unit, wherein the monitoring unit is configured to monitor a data transmission rate over a current transmission link used by a mobile terminal, and trigger the creating unit in the case that it is monitored that the data transmission rate over the current transmission link used by the mobile terminal is lower than a pre-set rate threshold;

the creating unit is configured to create a new transmission link for the mobile terminal; and the control unit is configured to control the mobile terminal to switch from the current transmission link to the new transmission link, wherein the session link control apparatus further comprises a first transmission unit, wherein the monitoring unit is configured to trigger the first transmission unit in the case that it is monitored that data transmission currently exists on the mobile terminal;

the first transmission unit is configured to send a session request message and receive a session response message corresponding to the session request message; and the monitoring unit is configured to take a transmission rate carried in the session response message as a monitored current transmission rate of the mobile terminal.

6. The session link control apparatus according to claim 5, wherein the monitoring unit is further configured to compare the monitored current transmission rate of the mobile terminal with the pre-set rate threshold.

7. The session link control apparatus according to claim 5, wherein the monitoring unit is configured to trigger the creating unit when it is determined that the monitored current transmission rate of the mobile terminal is lower than the pre-set rate threshold;

the creating unit is configured to create the new transmission link for the mobile terminal, add the new transmission link to a routing table for the mobile terminal, and transmit the routing table to the first transmission unit;

the first transmission unit is configured to send the routing table to the mobile terminal; and the control unit is configured to control the mobile terminal to switch from the current transmission link to the new transmission link in the routing table, so that the mobile terminal performs data transmission using the new transmission link.

8. The session link control apparatus according to claim 5, further comprising: a configuration unit, configured to configure a sending mode of the session response message of the mobile terminal, so that the mobile terminal sends the session response message according to the sending mode.

9. A non-transitory computer storage medium having stored therein computer executable instructions for performing a session link control method, the method comprising:

monitoring a data transmission rate over a current transmission link used by a mobile terminal; and in the case that it is monitored that the data transmission rate over the current transmission link used by the mobile terminal is lower than a pre-set rate threshold, creating a new transmission link for the mobile terminal, and controlling the mobile terminal to switch from the current transmission link to the new transmission link, wherein monitoring the data transmission rate over the current transmission link used by the mobile terminal comprises:

monitoring whether data transmission currently exists on the mobile terminal, and if it is monitored that data transmission currently exists on the mobile terminal, sending a session request message to the mobile terminal; and when a session response message sent by the mobile terminal is received, taking a transmission rate carried in the session response message as a monitored current transmission rate of the mobile terminal.

10. The non-transitory computer storage medium according to claim 9, wherein the method further comprises: after taking the transmission rate carried in the session response message as the monitored current transmission rate of the mobile terminal, comparing the monitored current transmission rate of the mobile terminal with the pre-set rate threshold.

11. The non-transitory computer storage medium according to claim 9, wherein controlling the mobile terminal to switch from the current transmission link to the new transmission link comprises:

when it is determined that the monitored current transmission rate of the mobile terminal is lower than the pre-set rate threshold, creating the new transmission link for the mobile terminal, adding the new transmission link to a routing table for the mobile terminal, and sending the routing table to the mobile terminal, so that the mobile terminal performs data transmission according to the routing table.

12. The non-transitory computer storage medium according to claim 9, wherein the method further comprises:
configuring a sending mode of the session response message of the mobile terminal, so that the mobile terminal sends the session response message according to the sending mode.

* * * * *